July 11, 1961

R. ZARGARPUR 2,992,300

VEHICLE SPEED WARNING DEVICE

Filed Feb. 4, 1959

INVENTOR
ROUHOLAH ZARGARPUR

By

JOHN C. BLACK
ATTORNEY.

July 11, 1961 R. ZARGARPUR 2,992,300
VEHICLE SPEED WARNING DEVICE
Filed Feb. 4, 1959 3 Sheets-Sheet 3

INVENTOR
ROUHOLAH ZARGARPUR

BY

JOHN C. BLACK.
ATTORNEY.

United States Patent Office 2,992,300
Patented July 11, 1961

2,992,300
VEHICLE SPEED WARNING DEVICE
Rouholah Zargarpur, River Forest, Ill., assignor to Stewart-Warner Corporation, Chicago, Ill., a corporation of Virginia
Filed Feb. 4, 1959, Ser. No. 791,092
5 Claims. (Cl. 200—56)

This invention relates to a vehicle speed warning device and more particularly to a device which is operatively connected to the speedometer of the vehicle incorporating such device.

Many vehicles today employ a speed warning device which initiates either a visible signal which may be easily spotted or operates to give an audible alarm when the operator of the vehicle exceeds a predetermined speed, usually a speed in the neighborhood of the lawful operating speed of the State or other locality through which the vehicle is being driven. In most cases, various devices employ an electrical circuit including a buzzer or a flashing light such that these alarms may be energized at a set, predetermined speed. The known devices are often associated with conventional speedometers wherein the moving portion of the speedometer may be utilized to close the electrical circuit. In addition, there is usually employed a manually operated device which is adapted to vary the particular speed at which the electrical circuit will be completed. This is necessarily made variable, since the vehicle may be travelling through various localities wherein the maximum State speed may vary. The present improved device is of this type and is particuarly adapted for use with a drum-type speedometer of the type shown in Patent No. 2,678,621, issued to Robert E. Proctor, Jr., May 18, 1954. However, the device is not limited to use with such type speedometers and may be employed in conjunction with other type, conventional speedometers.

One of the foremost problems encountered when attaching a vehicle speed warning device to the drive mechanism of a speedometer was the fact that attachment of such devices inherently resulted in placing some type of frictional load upon the speedometer. The attachment of such a warning device to the speedometer usually resulted in substantial error being introduced by the inclusion of such a device. Even where such error was small, as with devices coming fresh off the production line, after a period of some use, the associated wear would cause a considerable increase in the error produced which often ran as high as five miles per hour. An additional disadvantage in incorporating a speed warning device with the speedometer, was the fact that the frictional load upon the speedometer would vary depending upon whether the vehicle was operating at a speed greater or less than that necessary to energize the warning device.

It is therefore an object of this invention to provide an improved vehicle speed warning device which is driven by the vehicle speedometer wherein the load normally associated with such devices on the speedometer is greatly reduced.

It is a further object of this invention to provide an improved vehicle speed warning device which is driven by the vehicle speedometer wherein the load placed upon the speedometer is uniform throughout the speed range of the vehicle.

It is a further object of this invention to provide an improved vehicle speed warning device which is coupled to a conventional vehicle speedometer wherein substantially no error is introduced by the addition of the speed warning device.

In addition to the above-mentioned disadvantages, the known vehicle speed warning devices take up considerable space within the dashboard of the automobile and required a relatively large number of parts which results in a cost prohibitive to most buyers.

It is therefore an object of this invention to provide an improved vehicle speed warning device which is operated by the vehicle speedometer wherein the operating mechanism may be placed directly within the standard speedometer indicator housing without the necessity for additional dashboard space.

It is a further object of this invention to provide an improved vehicle speed warning device associated with a vehicle speedometer wherein the elements making up the device are greatly simplified over known devices.

Other objects of this invention will be pointed out in the following detailed description and claims and illustrated in the accompanying drawings which disclose, by way of example, the principle of this invention and the best mode which has been contemplated of applying that principle.

In the drawings:

FIGURE 5 is a front elevational view of an electrical circuit-forming disc of another embodiment of this invention;

FIGURE 6 is a partial schematic view of the essential elements making up the present invention.

Briefly, in one embodiment of this invention, there is provided a vehicle speed warning device which is associated with a drum-type drag-cup speedometer. The device is essentially an arrangement for completing an electrical circuit from a source of electricity to an electrical buzzer or light at a predetermined, selected speed. The cylindrical drum is adapted to be rotated through a limited arc about its geometric axis in responses to change in speed of the vehicle. A generally nonconductive disc is positioned coaxially with the cylindrical drum, the disc being freely rotated about its own axis. Means are provided for fixedly positioning the disc in any one of a plurality of angular positions depending upon the speed at which the buzzer is to be sounded. There is formed on the disc an outer, continuous conductive strip including a narrow conductive sector extending radially toward the axis of the disc. A first electrical contact member is fixedly positioned adjacent the disc and is in frictional engagement with the conductive strip. A second contact member is mounted for rotation around the axis of the disc and is adapted to be driven by the rotating speedometer drum with the second contact member also being in frictional engagement with the disc. This contact member is adapted to rotate about a path including the conductive sector. As the speed of the vehicle increases, the drum will revolve causing the rotatable contact member to contact the sector completing an electrical circuit through the electrical source to the buzzer or warning light indicating that the predetermined speed has been reached by the vehicle.

Figure 1:
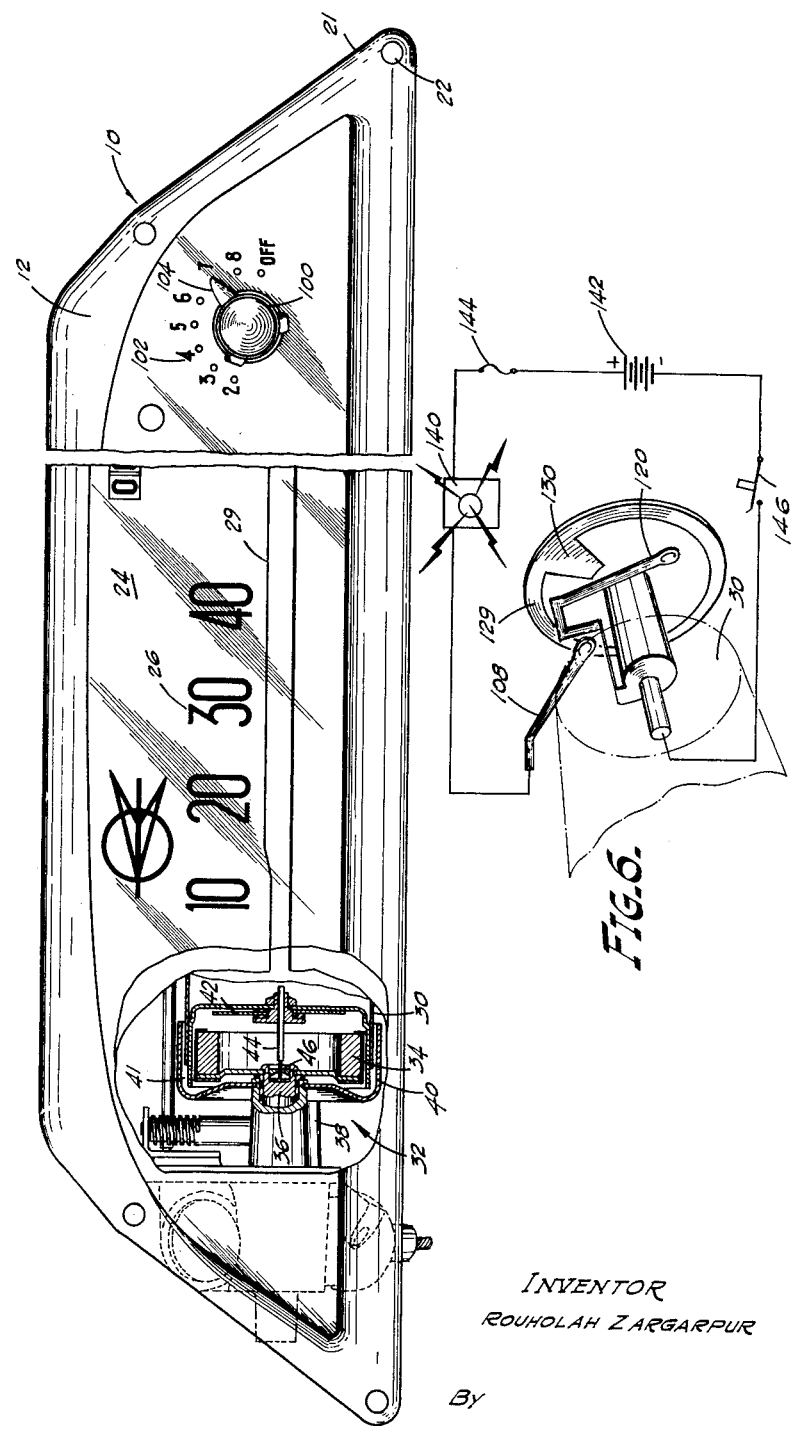
FIGURE 1 is a front elevational view, partially in section, of a drum-type speedometer employing one form of this invention.
Figure 3:
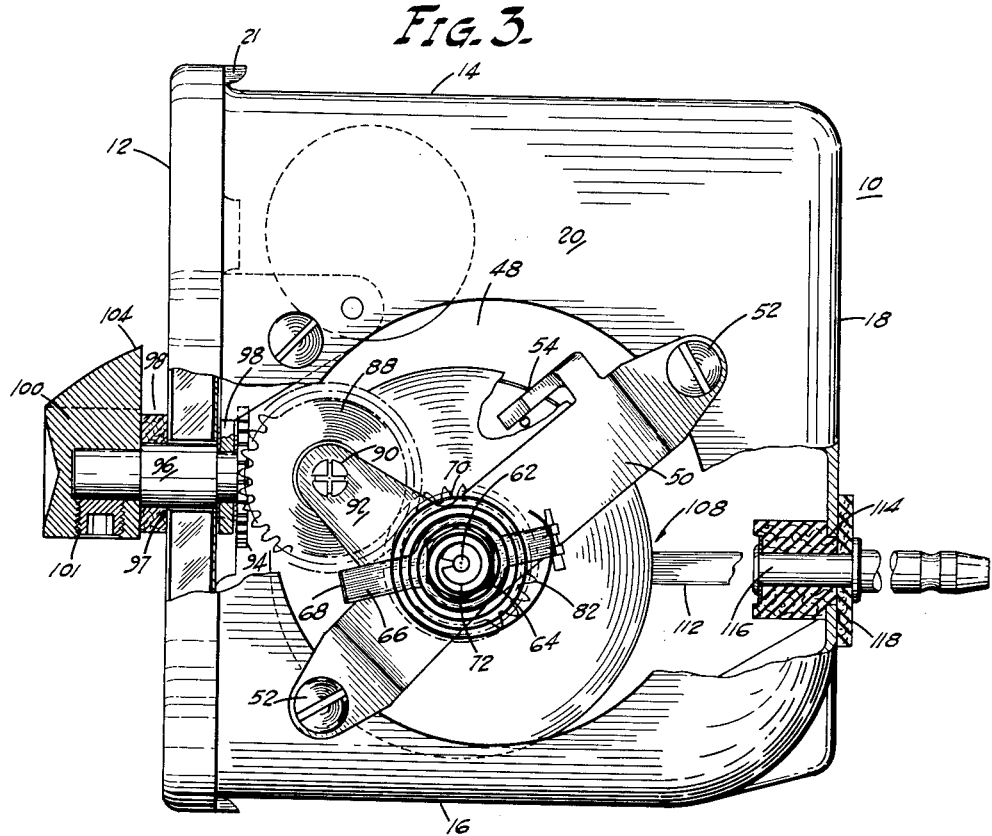
FIGURE 3 is a right end view, partially in section, of the apparatus shown in FIGURES 1 and 2.

Referring now to the drawings, there is shown in FIGURES 1 and 3 a drum-type speedometer including a generally elongated housing 10 having a front cover portion 12, a top wall 14, a bottom wall 16, a rear wall 18, and end walls 20. The front cover includes a flange portion 21 running completely around the outer edge of the elongated housing, the front cover portion 12 including a number of apertures 22 for allowing the speedometer to be mounted upon a conventional dashboard (not shown). The front cover includes a flat face portion 24 extending completely across the front of the housing. A conventional speed indicating scale 26 extends along a longitudinal line across the face portion 24 immediately above a narrow slot 29 which is also formed along a longitudinal line across the face portion 24. An elongated cylindrical drum 30 is positioned behind the front cover, within the housing 10, and is adapted to rotate around a horizontal axis in the conventional manner of the aforementioned Proctor Patent 2,678,621. As such, the cylindrical drum includes a helical line (not shown) which is formed upon the outer surface of the drum and is visible through the narrow elongated slot 29 to indicate the relative speed at which the vehicle is travelling. Briefly, the rotation of drum 30 is achieved by means of a magnetic drive assembly 32. The drive assembly 32 includes a permanent magnet 34 which is centrally located within drum 30 and rotatably driven by a rotary shaft 36, the rotary shaft 36 being positioned within a coaxial shaft support means 38. A field cup member 40 is rigidly attached to the drive shaft support means 38 and is adapted to surround the rotating magnet 34 so as to provide a complete magnetic circuit except for the air gap 41 which exists between the outer periphery of the magnet 34 and the sides of the cup. One end of the elongated, cylindrical drum 30 is positioned between the bar magnet 34 and the sides of the field cup 40. The magnetic field and eddy currents set up within the cylindrical drum 30 interact in a well known manner to cause angular movement of the drum 30 about its axis. In order to support the elongated cylindrical drum 30 within the air gap, there is provided a second, inverted, somewhat smaller cup 42 which acts as a support for the elongated cylindrical drum 30. The cup support member 42 is rigidly attached to the left-hand drum support shaft 44 whereby the shaft 44 freely rotates within the left-hand drum shaft bearing 46.

Figure 2:
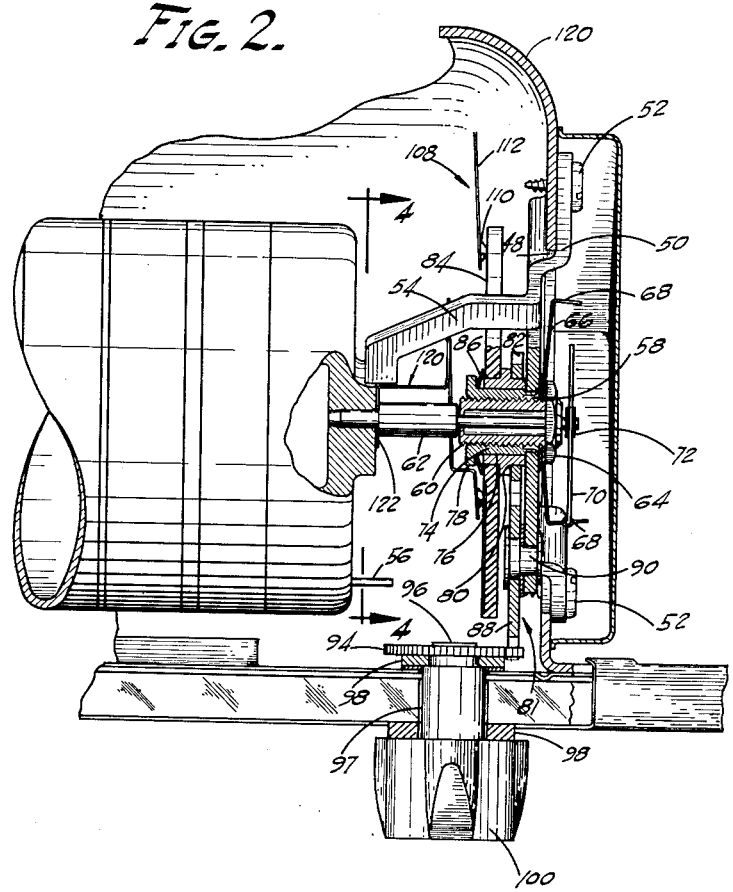
FIGURE 2 is a top plan view of a portion of the speedometer shown in FIGURE 1, partially in section.

Looking now to FIGURES 2 and 3, which show the right-hand side of the speedometer housing, it can be seen that an opening 48 is formed within the end wall 20. This opening is of a slightly greater diameter than the diameter of the elongated cylindrical drum 30 such that the elongated drum may be inserted within this opening and may be mounted with its left-hand support shaft 44 inserted within the bearing 46 during assembly. In order to support the right-hand end of the drum 30, there is provided a transverse, diagonally extending, cross arm support member 50 which is attached to the end wall 20 by a pair of screws 52. In order to limit the angular rotation of the drum 30, there is provided an inwardly directed extension arm 54 which is formed integrally with cross arm support member 50 and acts as one of the stop members. A tab 56, which is carried by drum 30 at the right end thereof, is adapted to contact the extension arm 54 and thereby limit its angular rotation. A suitable opening 58 is formed within the cross arm at the center thereof so as to receive a threaded, hollow, cylindrical, shaft support member 60. The hollow, cylindrical, support member 60 is adapted to receive a right-hand drum support shaft 62 which is rigidly attached at its inner end to the drum 30. The head 64 of the hollow cylindrical threaded shaft support member 60 is hollowed such that the shaft 62 extends therethrough. Between the head 64 of the threaded shaft support member 60, and cross arm support member 50, there is frictionally positioned a thin metallic strip member 66 whose end portions are curled slightly outward and terminate in flange portions 68. A helical coil spring 70 is positioned on the end of the right-hand drum support shaft 62 and at right angles thereto, by means of a cap 72 which is positioned on the end of shaft 62 so as to rigidly secure one end at the inner end of the helical coil spring 70 to this shaft. The outer end of the helical coil spring 70 is attached to one of the flange portions 68 of strip member 66. It is apparent therefore that rotation of the drum is resisted by the helical coil spring. In order to adjust the speedometer so as to insure its accuracy, the hollow, cylindrical threaded shaft support member is rotated sufficiently to allow the strip member to be rotated in an angular direction, thereby varying the effective bias of the helical spring 70.

The present invention is directed to an electrical speed warning device whose circuit making and breaking structure is closely associated with the conventional speedometers and is incorporated within the standard speedometer housing, particularly the type just described, that is, the drag-cup, elongated drum type. In this regard, the present invention provides a feature which has escaped the known structures providing make and break contacts which are driven by the rotating or moving member of the conventional speedometer. There is provided a device in which there is substantially no load placed upon the speedometer and as a result no appreciable error is introduced by the attachment of the speed warning device to the driven member of the speedometer and a system in which the load placed upon the speedometer will remain constant regardless of the speed of the vehicle. The present compact structure is incorporated in the right-hand end of the drum-type speedometer and is particularly associated with the bearing structure for supporting the right-hand drum support shaft 58. As indicated best in FIGURE 2, there is employed a second intermediate cylindrical member 74 which threadedly engages the hollow shaft support member 60 and is concentric thereto. The outer surface of this cylindrical member 74 is smooth and forms a bearing surface 76. The inner end of the cylindrical member 74 includes an integral radially extending flange portion 78 and a third cylindrical member 80 is positioned between the flange portion 78 and the inner surface of member 50. The third cylindrical member 80 is adapted to rotate freely upon the intermediate cylindrical member 74 and has rigidly attached thereto a nonconductive disc 84 which cooperates with the rotating drum 30 to give a warning when a predetermined speed is achieved. While the outer cylindrical member 80 is freely rotatable upon the intermediate cylindrical member 74, this support member 80 and its associated unconductive disc 84 is biased in an axial direction toward the member 50 by a spring washer 86 which is positioned intermediate of the disc 84 and the flange portion 78 of the intermediate cylindrical member 74. Thus, while the disc is allowed free rotary movement, it will be held in any one of a plurality of angular positions by the bias of the spring washer 86.

In order to position the disc 84 in a predetermined angular position, there is provided a suitable gear train 81 which includes a driven gear 82 which is rigidly attached to the outer cylindrical member 80 so as to rotate therewith. The gear train 81 further includes an intermediate gear 88 which is positioned in the same plane with the driven gear 82 and is supported for free rotation by means of support shaft 90, the support shaft 90 being mounted on an extension tab 92 formed integrally with the cross arm support member 50. This intermediate gear is in mesh on one side with the driven gear 82 and on the other with drive gear 94 positioned at right angles thereto. The drive gear 94 is mounted rigidly on drive gear shaft 96 which extends through a suitable aperture 97 formed in the face portion 24 of the front cover 12. Suitable spacers or bushings 98 are provided on either side of the face portion 24 and a phenolic control knob 100 is rigidly attached to the outer end of the drive gear shaft 96 by means of set screw 101 such that manual adjustment of the angular position of the nonconductive disc 84 may easily be made by simply rotating the control knob 100 to the desired position. In order to visually know the relative speed at which the warning will be given, there is provided indicia such as numerals 102 which are angularly disposed on the outer surface of the face portion 24 adjacent the rotating knob 100. Thus, rotation of the knob causes the pointer portion 104 to move from one numeral to the other. The particular position may be adjusted by set screw 101 so as to correspond to the particular speed desired prior to the warning being given.

Figure 4:
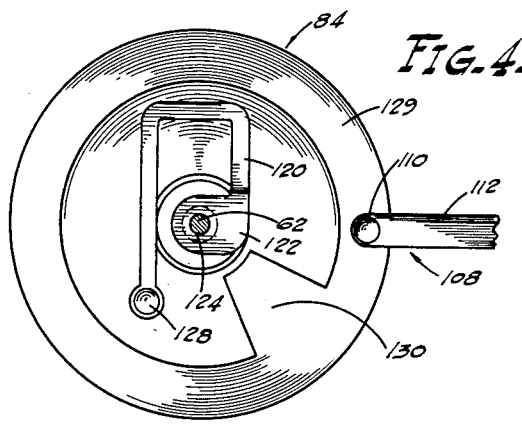
FIGURE 4 is a side elevational view taken along lines 4—4 of FIGURE 2 of the electrical circuit-forming disc and its associated contacts.

The disc 84 which is shown in one embodiment in FIGURE 4 and in another embodiment in FIGURE 5, forms a very impotrant part of the present invention. As noted previously, one of the inherent disadvantages in the known systems, is that the device associated with the contacts employed in the electrical circuit for actuating the buzzer or flashing light as a predetermined speed is reached, is constantly in frictional engagement with said contacts. As such, the switching elements are subjected to wear, and in any case provide a load or resistance to the moving speedometer member. Since the moving contact associated with such devices moves from a nonconductive to a conductive area to effect completion of the associated electrical circuit, there is also inherently a change in the load or resistance placed upon the speedometer. The present invention provides an electrical circuit making and breaking structure in which the resistance to the moving speedometer member is almost negligible, whereby substantially no error is introduced by the speed warning device, and at the same time provides a load which is constant regardless of whether the circuit is completed or not. This result is achieved by employing a disc 84 which, for example, may be formed by securing a thin metallic plate of silver clad phosphorous bronze drawings to a thin fiber base of phenolic material. A very thin coating of melamine may then be applied between the metallic plate and the phenolic material. The melamine acts as an arc suppressor to alleviate wearing of the nonconducting portion of the disc. The laminated disc of phenolic and bronze may then be etched to leave only the desired electrical conductor configuration, consisting of strip 129 and sector 130, on the disc. In order to insure that the contact surface is completely smooth such that there will be no appreciable relative movement between the contact member 120 and the disc as the contact member moves from the conductive to the nonconductive portion or vice versa, the disc may then be placed in a press which forces the metallic material into the phenolic to provide a flush surface.

Associated with the disc member is a first stationary contact member 108 which is positioned at right angles to the axis of the disc, and includes a contact element 110 at the inner end thereof which contacts the inner surface of disc 84. First stationary contact member 108 further includes a flexible strip portion 112 which extends away from the disc, towards the rear wall 18. A suitable aperture 114 is formed within the rear wall 18 and a terminal member 116 projects through the aperture and is spaced from the rear wall by means of a conventional insulating bushing 118. The strip portion 112 imparts sufficient force on the contact head so that the contact head will remain in frictional engagement with the surface of disc 84. A second, rotating, contact member 120 is also formed of a thin, conductive, metal strip and includes a central base portion 122 having an aperture 124 which is adapted to receive the inner end of the drum support shaft 62, the base portion 122 being rigidly attached to the shaft 62 and to the right-hand side of the drum 30 such that it will rotate with the drum 30 as the drum is being driven by the magnetic drive assembly 32. The outer end of the rotating contact member 120 includes a contact cap or element 128 which also frictionally engages the inner surface of disc 84. As indicated, the rotating contact member 120 makes line contact with the disc at a radius which is much closer to the axis of the disc than does the stationary contact member 108. While this arrangement is purely arbitrary, it can be appreciated that since the stationary contact remains fixed during the normal operation of the device, and the rotary contact 120 is constantly moving, the forces of friction are thereby minimized. This is so, since the frictional torque is proportional to the distance of the movable contact from the drum axis. While the stationary contact member is insulated from the housing, the rotary contact member is purposely in electrical conducting relation with the structure as a whole and the housing itself provides a passage for the electrical current to ground.

In order to see how an electrical circuit is completed between the two contact members during operation of the device, reference may be had to FIGURE 4 which shows the essential elements making up the make and break switch, including one form the disc 84 may take. As noted previously, the otherwise nonconductive, phenolic disc includes a thin metallic plate of silver clad phosphorous bronze drawings on a portion of the inner surface and as indicated, this metallic plate includes a continuous conductive strip 129 which is formed near the outer periphery of the disc such that regardless of the angular position to which the disc may be placed, the stationary contact member 108 will always have its contact point touching this portion of the disc. An inwardly directed sector 130 is formed integrally with the outer continuous strip 129 while the remainder of the disc surface remains nonconductive, being phenolic. It can be appreciated that as the drum 30 rotates, the movable contact point will move in a path which will include the sector portion 130. At this point, as the contact point engages the sectors surface 130, there will be an electrical circuit completed through the bronze metallic plate and a buzzer, or signal light, will be energized. Since the thin metallic plate of bronze is imbedded in the phenolic surface, there will be no appreciable change in resistance, and at the same time, the smooth surface will result in almost negligible load being placed upon the speedometer.

However, since the electrical circuit is being opened and closed at the point at the edge of the sector portion, there will occur, as in all electrical switching operations, a certain amount of arcing. Under normal circumstances, the arcing will act to pit the phenolic or insulative surface at this point and after continued use of the device, the surfaces adjacent the sector will become relatively roughened. This will cause a variance in the load placed upon the speedometer, as well as an increase in load at this point. In order to eliminate this trouble, an alternative and preferred embodiment is shown in FIGURE 5. The phenolic disc 84 here shown also includes an imbedded outer continuous conductive, metallic, bronze strip 132 which completely encircles the disc. In like manner to the embodiment in FIGURE 4, there is also provided an inwardly directed sector 134 which is integral with the continuous outer strip and is positioned so as to be in the path of the moving contact member. However, in this case, there is provided a second metallic portion or strip 136 which is concentric to and positioned inside the continuous outer strip 132 but radially displaced therefrom. This portion 136 also encircles the disc except at the point where the sector is formed. The inner strip 136 terminates at this point and is spaced slightly from the sector so as to form a gap 138 which, for example, may be one thirty-seconds of an inch. The gap 138 is large enough to prevent an electrical circuit being completed between the inner and outer strip, and is in close proximity such that the movable contact moves from the central strip to the sector with no appreciable delay. In fact, the contact portion touches both the metallic sector 134 and the metallic inner strip 136 at the same time as it moves from one to the other, and as a result, there is no pitting of the phenolic and no error is introduced into the speedometer. Again, it will be seen from FIGURES 4 and 5 that the moving contact member contacts the disc at a portion very close to the axis of the rotating drum such that the frictional force on the moving drum by the disc is relatively small since the frictional force is proportional to the distance from the axis of the drum.

The operation of the present improved warning device and its simplified construction can be appreciated by reference to FIGURE 6. There is shown the basic elements of the speed warning device as connected to a conventional electrical circuit including an electric buzzer or flashing light 140, a battery or other power supply 142, a fuse 144, and a manually operated switch member 146. Prior to operation of the vehicle, the speed will be selected by rotating the control knob 100 to the desired numeral 102 indicated on the face portion 24. This will result in rotation of the disc 84 to an angular position corresponding to the numeral indicated on the face portion. Closing of the manual switch 146 is all that is required to insure that the buzzer or alarm will be sounded when the predetermined speed is reached. As the vehicle is set into motion, and the speed of the machine increases, the magnetic drive assembly will act to rotate the elongated drum 30 against the bias of the coil spring 70. As the drum rotates, it will also act to move the movable contact arm 120 which will follow an angular path along the surface of the now stationary disc 84. As the rotating contact point passes from the phenolic insulating portion of the disc, onto the bronze metallic surface of sector 130, a circuit will now be completed from the sector 130 through the moving contact member 120, through the closed manual switch 146, the battery or power source 142, the flasher or buzzer 140 to the stationary contact 108 and back through the outer conductive strip 129 to the sector 130. As in conventional speed warning devices, as the operator takes his foot off the accelerator, and the vehicle slows down, the drum 30 will rotate in the opposite direction in response to bias of the spring, thus moving the movable contact off the sector 130 and back on to the phenolic nonconductive portion of the disc. This will break the circuit to the buzzer 140. As in conventional systems, the operator will normally be driving the vehicle at a speed close to the desired limit such that the buzzer will be alternatively energized and de-energized. It is for this reason that the present simplified structure is especially useful since it will effect a constant load upon the speedometer, however, the load is almost negligible and in no way introduces an error into the speedometer which may be detrimental to its being driven by the speedometer itself.

While the device has been particularly described as used with drum-type speedometers, it may be employed with other types of speedometers, the only requirement being that suitable drive means are provided for rotating the rotatable contact member with respect to the disc.

While there have been shown and described and pointed out the fundamental novel features of the invention as applied to the preferred embodiments, it will be understood that various omissions and substitutions and changes in the form and detalis of the device illustrated and in its operation may be made by those skilled in the art without departing from the spirit of the invention. It is the intention therefore to be limited only as indicated by the scope of the following claims.

What is claimed is:

1. In a low torque magnetic speedometer of the type including a right circular cylinder revolvable about its geometric axis in response to changes in speed of a vehicle, the combination of a rotatable disc of nonconductive material having an elongated conductive strip imbedded therein to form a flush surface with the nonconductive material and having a coating of melamine interposed between the nonconductive material and the conductive strip for arc suppression, means rotatably mounting the disc in axially spaced relation with the cylinder, means for adjusting the position of the disc in any one of a plurality of angular positions, a first electrical contact member positioned adjacent the disc for frictional engagement with the conductive strip in all adjusted positions of the disc, and a second electrical contact member mounted for coaxial rotation with the cylinder in frictional engagement with the disc and engaging the conductive strip in a position of the cylinder determined by the angular adjusted position of the disc, the second contact member including a first portion extending generally away from the cylinder and including a second elongated portion extending progressively in different directions to a free disc contacting end thereof for low contact pressure engagement with the disc to produce low frictional loading in relation to the cylinder driving torque.

2. In a low torque magnetic speedometer of the type including an elongated cylinder revolvable about its geometric axis in response to changes in speed of a vehicle, the combination of a disc of nonconductive material having a first elongated conductive strip imbedded therein to form a flush surface with the nonconductive material and having a coating of melamine interposed between the nonconductive material and the conductive strip for arc suppression, means rotatably mounting the disc in axially spaced relation with the cylinder, means for adjusting the position of the disc in any one of a plurality of angular positions, a first electrical contact member positioned adjacent the disc for frictional engagement with the conductive strip in all adjusted positions of the disc, a second electrical contact member mounted for coaxial rotation with the cylinder in frictional engagement with the disc and engaging the conductive strip in a position of the cylinder determined by the angular adjusted position of the disc, the second contact member including a first portion extending generally away from the cylinder and including a second portion extending progressively in different directions substantially in the single plane to a free disc contacting end thereof for low contact pressure engagement with the disc to produce low frictional loading in relation to the cylinder driving torque, and a second conductive strip imbedded in and flush with the nonconductive material in close proximity to the first strip for simultaneous engagement of the contacting end of the second contact member with both strips as it moves from engagement with one of the strips to the other, thereby to inhibit non-uniform frictional loading.

3. In a low torque magnetic speedometer of the type including a cylinder revolvable about its geometric axis in response to changes in speed of a vehicle, the combination of a disc of nonconductive material having a first elongated conductive strip imbedded therein to form a flush surface with the nonconductive material, means rotatably mounting the disc in axially spaced relation with the cylinder, means for adjusting the position of the disc in any one of a plurality of angular positions, a first electrical contact member positioned adjacent the disc for frictional engagement with the conductive strip in all adjusted positions of the disc, a second electrical contact member mounted for coaxial rotation with the cylinder in frictional engagement with the disc and engaging the conductive strip in a position of the cylinder determined by the angular adjusted position of the disc, the second contact member including a first portion extending generally away from the cylinder and including a second portion extending progressively in different directions substantially in the single plane to a free disc contacting end thereof for low contact pressure engagement with the disc to produce low frictional loading in relation to the cylinder driving torque, and a second conductive strip imbedded in and flush with the nonconductive material in close proximity to the first strip for simultaneous engagement of the contacting end of the second contact member with both strips as it moves from engagement with one of the strips to the other, thereby to inhibit non-uniform frictional loading.

4. In a low torque magnetic speedometer of the type including a right circular cylinder revolvable about its geometric axis in response to changes in speed of a vehicle, the combination of a disc of nonconductive material having an arcuate conductive strip imbedded therein to form a flush surface with the nonconductive material and having a coating of melamine interposed between the nonconductive material and the conductive strip for arc suppression, means rotatably mounting the disc with the strip in spaced coaxial relation to the cylinder, means for adjusting the position of the disc in any one of a plurality of angular positions, a first electrical contact member positioned adjacent the disc for frictional engagement with the conductive strip in all adjusted positions of the disc, the conductive strip including a sector projecting radially inwardly, and a second electrical contact member mounted for coaxial rotation with the cylinder in frictional engagement with the disc and engaging the conductive sector in a position of the cylinder determined by the angular adjusted position of the disc, the second contact member including a first portion extending generally away from the cylinder and having a second portion extending progressively in different directions substantially in the single plane to a free disc contacting end thereof for low contact pressure engagement with the disc to produce low frictional loading in relation to the cylinder driving torque.

5. In a low torque magnetic speedometer of the type including a right circular cylinder revolvable about its geometric axis in response to changes in speed of a vehicle, the combination of a disc of nonconductive material having an arcuate conductive strip imbedded therein to form a flush surface with the nonconductive material and having a coating of melamine interposed between the nonconductive material and the conductive strip for arc suppression, means rotatably mounting the disc with the arcuate strip in spaced coaxial relation to the cylinder, means for adjusting the position of the disc in any one of a plurality of angular positions, a first electrical contact member positioned adjacent the disc for frictional engagement with the conductive strip, the conductive strip including a sector projecting radially inwardly, a second electrical contact member mounted for coaxial rotation with the cylinder in frictional engagement with the disc and engaging the conductive sector in a position of the cylinder determined by the angular adjusted position of the disc, the second contact member including a first portion extending generally away from the cylinder and including a second elongated portion extending progressively in different directions substantially in the single plane to a free disc contacting end thereof for low contact pressure engagement with the disc to produce low frictional loading in relation to the cylinder driving torque, and a second conductive strip imbedded in and flush with the nonconductive material in close proximity to at least one edge of the sector for simultaneous engagement of the contacting end of the second contact member with the second strip and the sector as it moves from engagement with the sector to the second strip and from engagement with the second strip to the sector thereby to inhibit non-uniform frictional loading.

References Cited in the file of this patent

UNITED STATES PATENTS

| | | |
|---|---|---|
| 1,557,291 | Jacobs | Oct. 13, 1925 |
| 2,433,895 | Fairhurst | Jan. 6, 1948 |
| 2,813,264 | Wargo | Nov. 12, 1957 |